F. J. MOSER.
DEVICE FOR ATTACHING REELS TO ENGINES.
APPLICATION FILED MAY 20, 1911.

1,024,592.

Patented Apr. 30, 1912.

Witnesses
B. M. Hartman
Vinnie C. Hess

Inventor
Fred Jozeph Moser
by W. R. L.
Attorney

COLUMBIA PLANOGRAPH CO., WASHINGTON, D. C.

UNITED STATES PATENT OFFICE.

FRED JOSEPH MOSER, OF KANE, PENNSYLVANIA.

DEVICE FOR ATTACHING REELS TO ENGINES.

1,024,592. Specification of Letters Patent. Patented Apr. 30, 1912.

Application filed May 20, 1911. Serial No. 628,601.

*To all whom it may concern:*

Be it known that I, FRED J. MOSER, a citizen of the United States, residing at Kane, county of McKean, and State of Pennsylvania, have invented new and useful Improvements in Devices for Attaching Reels to Engines, of which the following is a specification.

This invention relates to a device for attaching reels to engines and consists in certain improvements in the construction thereof as will be hereinafter fully described and pointed out in the claims.

In operating reels with oil wells it is often desirable to attach the reel to the engine to operate it and to use the reel so attached for winding measuring lines or torpedo lines from the well. With the ordinary devices for securing the reel to the engine, difficulty has been experienced in centering the reel with the engine shaft, and where this was not accomplished there has been such wabbling of the reel as to tend to throw the line off the reel.

The object of the present invention is to so arrange the attaching device that the reel may be readily centered and alined with the axis of the shaft.

Figure 1:
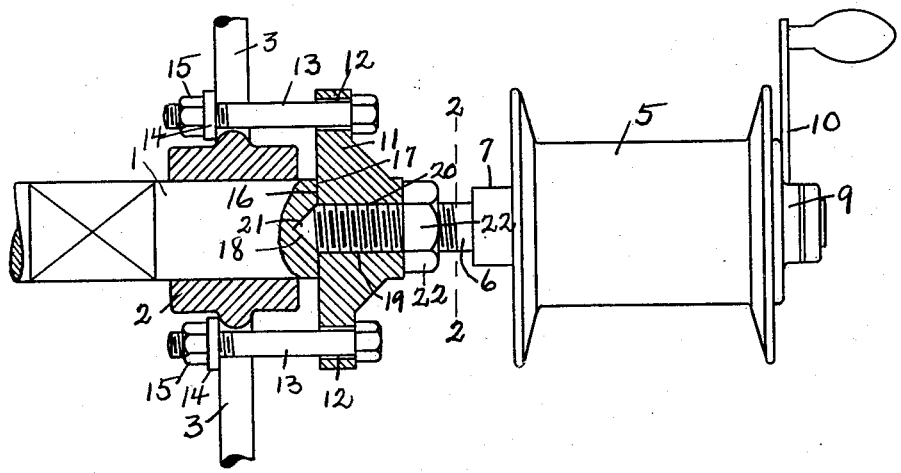
Figure 2:
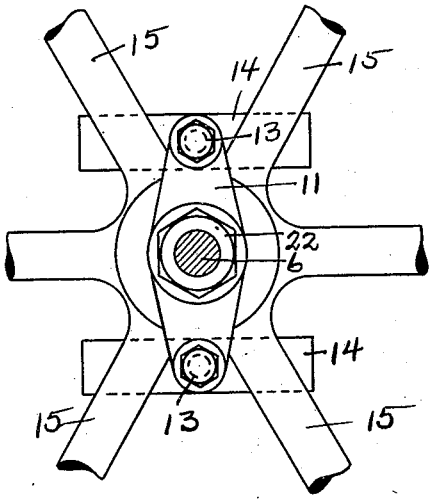

The invention is illustrated in the accompanying drawings as follows:

Figure 1 shows a central section through the end of the shaft showing the hub of a pulley and part of the spokes with a reel attached thereon. Fig. 2 a section on the line 2—2 in Fig. 1.

1 marks the engine shaft, 2 the hub of the pulley, ordinarily the fly wheel, and 3 the spokes on the pulley.

The reel 5 may be of any construction, but preferably of the construction shown in my Patent #964,116, dated July 12, 1910. The reel is mounted on the shaft 6 and the spool of the reel is clamped between the collars 7 and 9 by means of the crank 10.

A clamping plate 11 has the perforations 12 at its ends and clamping bolts 13 extend through these perforations between the spokes 3 through the plates 14. Nuts 15 are arranged on the ends of the bolts 13 by means of which the plate 11 may be drawn up against the end of the shaft 1. The shaft has the face 16 which is ordinarily surfaced in a plane at right angles to the axis of the shaft. The plate 11 has its face 17 surfaced so that when the plate 11 is clamped onto the end of the shaft, the surfaces 16 and 17 will assure the position of the plate making the surface 17 in a plane at right angles to the axis of the shaft. The shaft preferably has the detent 18 arranged at the axis of the shaft, this detent forming a centering surface on the end of the shaft. The plate 11 has the perforation 19 through which the screw threaded end 20 of the shaft 6 is screwed. The end of the shaft has the point 21 which is adapted to operate upon the detent 18 and thus center the plate 11.

It will be readily observed that if the perforation 19 is at right angles to the surface 17, and the surface 17 is at right angles to the axis of the shaft, the axis of the shaft 6 must be in alinement or parallel to the shaft 1. By centering the plate 11 by means of the pointed end 21 and detent 18, the axis of the shaft 6 is brought into alinement with the axis of the shaft 1 so that the reel is thereby centered and prevented from wabbling. A jam nut 22 may be arranged on the shaft 6 for locking the shaft in the plate 11.

If desired, the pointed end 21 may be used in connection with the screw end as any screw may be, simply for centering the plate on the shaft, and it is not necessary after the plate 11 is centered to maintain it in position, but it is desirable.

By bringing the surfaces 17 and 16 into contact the axis of the shaft 6 is brought either to alinement or parallel with the axis and the parts may be centered without the use of the point 21, but I prefer using such centering device.

What I claim as new is:

1. In a device for attaching reels to engines having an engine shaft, the combination of a plate adapted to seat on the face of the shaft; a clamp for securing the plate on the face of the shaft; a reel comprising a reel shaft of small diameter compared to the engine shaft; and means for attaching the reel to the plate.

2. In a device for attaching reels to engines having an engine shaft, the end of said shaft having a centering surface at its axis, the combination of a plate adapted to seat on the end of the shaft; a clamp for securing the plate on the face of the shaft; means adapted to operate upon the centering surface for centering the plate in relation to the shaft; a reel having a shaft of small diameter compared to the engine shaft; and mechanism for attaching the reel to the plate.

3. In a device for attaching reels to engines having an engine shaft, said shaft having a centering surface at its axis, the combination of a plate adapted to seat on the end of the shaft, said plate having a screw threaded perforation at its center; a clamp for securing the plate on the end of the shaft; a reel shaft of small diameter compared with the diameter of the engine shaft having an end adapted to operate upon the centering surface of the shaft to center the plate, said reel shaft being provided with screw threads for operating upon the screw threaded perforation in the plate; and a reel on the reel shaft.

4. In a device for attaching reels to engines having an engine shaft with a centering surface on its end at its axis; a plate for supporting a reel, said plate having a perforation at its center; means for securing the plate to the engine shaft; a device operating through the perforation and upon the centering surface for centering the plate; a reel, comprising a reel shaft of small diameter compared with the diameter of the engine shaft; and means carried by the plate for supporting a reel.

5. In a device for attaching reels to engines having an engine shaft, the combination of a plate adapted to seat and center on the end of the shaft; a clamp for securing the plate on the end of the shaft; and a reel comprising a reel shaft of small diameter compared with the engine shaft, said reel shaft being supported by said plate.

In testimony whereof I have hereunto set my hand in the presence of two subscribing witnesses.

FRED JOSEPH MOSER.

Witnesses:
W. H. BUNCE,
JOSEPHINE ROCHE.

---

Copies of this patent may be obtained for five cents each, by addressing the "Commissioner of Patents. Washington, D. C."